United States Patent
Bakis et al.

(10) Patent No.: US 8,046,213 B2
(45) Date of Patent: Oct. 25, 2011

(54) ON DEMAND TTS VOCABULARY FOR A TELEMATICS SYSTEM

(75) Inventors: Raimo Bakis, Briarcliff Manor, NY (US); Ellen M. Eide, Bedford Hills, NY (US); Wael Hamza, Tarrytown, NY (US)

(73) Assignee: Nuance Communications, Inc., Burlington, MA (US)

( * ) Notice: Subject to any disclaimer, the term of this patent is extended or adjusted under 35 U.S.C. 154(b) by 1125 days.

(21) Appl. No.: 10/913,004

(22) Filed: Aug. 6, 2004

(65) Prior Publication Data

US 2006/0031062 A1  Feb. 9, 2006

(51) Int. Cl.
  *G06F 17/20* (2006.01)
  *G10L 21/00* (2006.01)
  *G01C 21/30* (2006.01)
(52) U.S. Cl. ............ 704/8; 704/270.1; 701/211
(58) Field of Classification Search ............ 704/201
  See application file for complete search history.

(56) References Cited

U.S. PATENT DOCUMENTS

| | | | | |
|---|---|---|---|---|
| 5,835,854 A * | 11/1998 | Palisson et al. | ............ | 455/186.1 |
| 5,945,985 A * | 8/1999 | Babin et al. | ................ | 715/500.1 |
| 6,081,803 A * | 6/2000 | Ashby et al. | ..................... | 707/4 |
| 2002/0111810 A1 * | 8/2002 | Khan et al. | ..................... | 704/275 |
| 2003/0229441 A1 * | 12/2003 | Pechatnikov et al. | ......... | 701/201 |
| 2004/0215451 A1 * | 10/2004 | Macleod | ....................... | 704/231 |
| 2004/0220726 A1 * | 11/2004 | Jin et al. | ........................ | 701/207 |
| 2005/0065779 A1 * | 3/2005 | Odinak | ......................... | 704/201 |

* cited by examiner

*Primary Examiner* — Talivaldis Ivars Smits
*Assistant Examiner* — Jesse Pullias
(74) *Attorney, Agent, or Firm* — Wolf, Greenfield & Sacks, P.C.

(57) ABSTRACT

A driving directions system loads into memory a limited subset of prerecorded, spoken utterances of geographic names from a mass media storage. The subset of spoken utterances may be limited, for example, to the geographic names within a predetermined radius (e.g., a few miles) of the driver's present location. The present location of the driver may be manually entered into the driving directions system by the driver, or automatically determined using a global positioning system ("GPS") receiver. As the vehicle moves from its present location, the driving directions system loads into memory new names from the mass media storage and overwrites, if necessary, those which are now geographically out of range. Based on the current location of the driving, the driving directions system can audibly output geographic names from the run-time memory.

20 Claims, 1 Drawing Sheet

ON DEMAND TTS VOCABULARY FOR A TELEMATICS SYSTEM

BACKGROUND OF THE INVENTION

1. Field of the Invention

The present invention relates to telematics systems, and, more particularly, on demand text-to-speech ("TTS") vocabulary for a telematics system.

2. Description of the Related Art

Telematics applications are continually increasing in popularity, especially in the automotive industry. Such applications can provide numerous functions ranging from airbag deployment notification to emergency services. One pervasive telematics application increasingly found in more and more vehicles is a driving directions system. Once reserved for only high-end vehicles, driving directions systems are increasingly available in lower-end vehicles as well as a variety of vehicle brands, styles and types.

Typical vehicle driving directions systems include a user-interactive display, a processor with memory, and mass storage media. The driving directions systems may further include a global positioning system ("GPS") receiver for detecting the current location of the vehicle. The mass storage media, which are used to store maps and other information, may include CD-ROMs, DVD-ROMs, and the like.

The addition of the GPS receiver with the driving directions system allows for, among other things, turn-by-turn directions from one location to another. Because a GPS-based driving directions system is automatically aware of the location of the vehicle, the system can notify the driver when it is necessary to turn and in what direction.

An increasing number of vehicles also provide audible turn-by-turn directions. A number of GPS-based driving directions system utilize audible turn-by-turn directions to increase safety and ease of use. A typical audible driving directions systems may audibly notify the driver of the distance from a turn and the direction of the turn (e.g., left, right). However, these systems omit various other information including, for example, geographic names such as streets, cities, towns, counties, points of interest, and the like.

SUMMARY OF THE INVENTION

In one exemplary aspect of the present invention, a driving directions system is provided. The driving directions system includes a location means for obtaining a location of a vehicle; a map storage means for storing maps; an utterance storage means for storing utterances of geographic names corresponding to the maps; a destination means for receiving a final destination; a run-time memory for receiving a subset of the utterances of geographic names based on the location of the vehicle, the final destination, and at least one of the maps in the map storage means; and a speech playback means for audibly outputting at least one of the subset of utterances based on the location of the vehicle, the final destination, and at least one of the maps in the map storage means.

In another exemplary aspect of the present invention, a driving directions system is provided. The driving directions system includes a large storage media for storing utterances of geographic names; a location determination module for obtaining a location of a vehicle; a storage manager for (a) receiving the location from the location determination module, (b) retrieving a subset of the utterances of geographic names from the large storage media based on the location, and (c) storing the subset of the utterances of geographic names in a working storage; a dialog manager for receiving (d) the location from the location determination module; (e) a final destination, and (f) a map; wherein the dialog manager retrieves at least one of the subset of the utterances from the working storage based on (d), (e) and (f); and wherein the dialog manager audibly outputs the at least one of the subset of the utterances.

In yet another exemplary aspect of the present invention, a driving directions system is provided. The driving directions system includes a large storage media for storing compressed, digitally-encoded utterances of geographic names; a location determination module for obtaining a location of a vehicle; a storage manager for (a) receiving the location from the location determination module, (b) retrieving a subset of the compressed, digitally-encoded utterances of geographic names from the large storage media based on the location, (c) decompressing the subset of the compressed, digitally-encoded utterances into uncompressed utterances, and (d) storing the uncompressed utterances in a working storage; a dialog manager for receiving (e) the location from the location determination module; (f) a final destination from a destination input module, and (g) a map from a map database; wherein the dialog manager retrieves at least one the uncompressed utterances from the working storage based on (e), (f) and (g); and wherein the dialog manager instructs a speech playback module to audibly output the uncompressed utterances.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
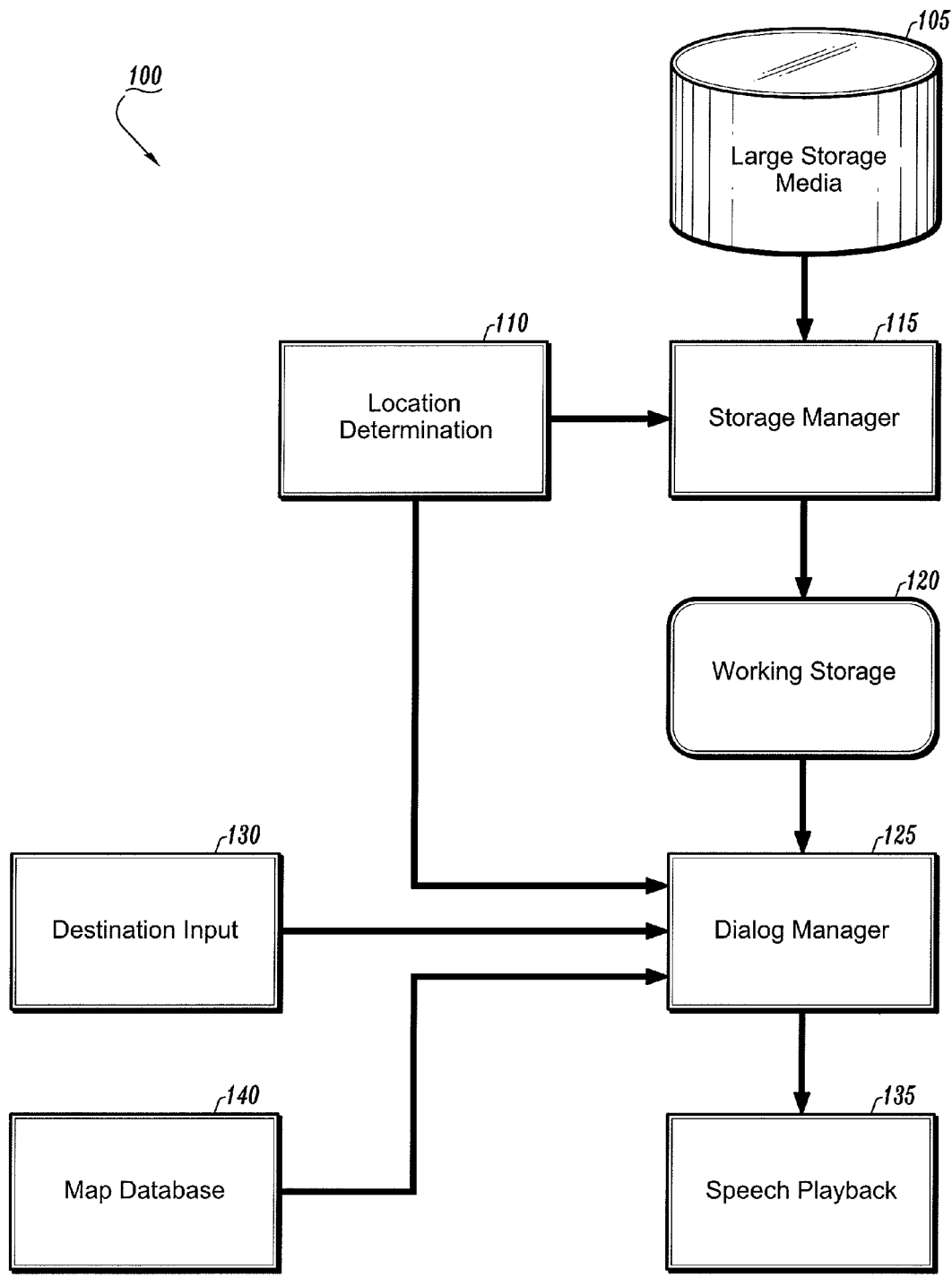
FIG. 1 depicts an exemplary implementation of a driving directions system, in accordance with one embodiment of the present invention.

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Current driving directions systems, do not audibly provide geographic names, such as streets, cities, towns, counties, points of interest, and the like. Geographic names may further include natural features, man-made features, administrative regions, political subdivisions, military installations closed to civilian traffic, demilitarized zones, and the like. Because the run-time memory (hereinafter "memory") in such systems is generally limited, and the number of possible geographic names is substantially large, it is generally not possible to store the utterances of all the geographic names in the memory at one time. Because of this, most driving directions systems omit potentially important geographic names, and convey less descriptive generic directions, such as, "turn left in half a mile." The alternative of generating names from a concatenative synthesizer may not yield sufficiently high quality, especially for unusually spelled and uncommon names. The concatenative synthesizer stores a database of a limited number of words, and constructs utterances of unknown words not in the database by splicing together utterance portions from the database.

We propose a driving directions system that loads into memory a limited subset of prerecorded, spoken utterances of geographic names from a mass media storage, for example, a CD-ROM or a DVD-ROM. The subset of spoken utterances may be limited, for example, to the geographic names within a predetermined radius (e.g., a few miles) of the driver's present location. The present location of the driver may be manually entered into the driving directions system by the driver, or automatically determined using a global positioning system ("GPS") receiver. As the vehicle moves from its present location, the driving directions system loads into memory new names from the mass media storage and overwrites, if necessary, those which are now geographically out of range.

The driving directions system may have access to one or more large speech databases containing utterances of a plurality of geographic names. The utterances may be in any of a variety of digitally encoded audio formats, such as WAVE. The one or more large speech databases may be stored on any number of mass storage media, and may be indexed in any of a variety of organizations, as is contemplated by those skilled in the art. For example, each large speech database may correspond to a large geographic region, such as a continent (e.g., Europe, South America). For another example, each large speech database may correspond to a country. It is understood that the data in the speech database may be stored in a compressed format, as contemplated by those skilled in the art. The compressed format may be converted to an uncompressed format in the run-time memory prior to outputting, thus requiring fewer compute cycles. Decompression may be performed by a decompression module. It is further understood that the mass media storage may be present locally in the vehicle, or remotely outside of the vehicle. A remote mass media storage may be accessed, for example, through a network such as the Internet.

The large geographic regions in the index may be further divided into smaller local regions. Each local region may be organized such that one or more native speakers are used to speak the geographic names of the particular local region. Numerous speakers may be used, for example, to cover the various dialects, accents, etc. of the local region. Further, the geographic names of certain local regions, such as popular tourists destinations, may be recorded in several languages, dialects and accents. For example, although recordings of geographic names in Paris, France would obviously include French, because Paris is a popular tourist attraction visited by many across the world, it follows that the geographic names may be recorded in other languages, such as English. For another example, the city of Munich, Germany may be recorded as "München" in German and "Munich" in English.

As the driver moves from one location to another, the system consults the portion of the index (i.e., the local region) that lists the geographic names needed in the vicinity of the current location. With the potential for numerous recordings for the same geographic names, the driving directions systems may automatically decide which street name to use, or allow the driver to manually decide. For example, recorded versions of the name "Main Street" in a North American large geographic region may include a Canadian local region version, a general United States local region version, a New England local region version, a southern United States local region version, and the like. Once the driving directions system determines the current location of the driver (e.g., received automatically through a GPS receiver or manually from the driver), if the driving directions system determines, for example, that a "Main Street" exists within a short distance (e.g., a few miles) of its current location, then the appropriate version of "Main Street" in the speech database is transferred to the memory of driving directions system. If "Main Street" is already in the run-time memory, but it is not needed at the current location or is a wrong version, the system may either remove this copy of "Main Street" from the run-time memory or mark it for overwrite to make room for other names.

The local regions in the index may be organized for example in terms of a grid, for example, 5×5 kilometer ("Km") squares. Each portion of the index corresponding to a square may include pointers to utterances (i.e., audio files) of geographic names likely to be needed when the vehicle is in that square. Each portion of the index corresponding to a square may further include pointers to geographic names surrounding the square for, for example, 1 Km. Thus, the driving directions system loads only the needed speech samples as the vehicle moves from square to square. Unused speech samples may be deleted or marked for overwrite. A high data transfer rate is not needed because new utterances for surrounding locations can be loaded and decompressed well before the vehicles approaches them.

Thus, by having the full natural and correct pronunciation of almost every name available on-demand in the run-time memory, the system would be able to speak driving directions in a highly intelligible and appropriate manner. Even unusual names would be spoken as clearly as if a local guide speaking the driver's language were sitting beside the driver. This would minimize listener fatigue, stress, and distraction, and would improve traffic safety.

Referring now to FIG. 1, an exemplary implementation of a driving directions system 100 is shown, in accordance with one embodiment of the present invention. A large storage media 105 contains recorded utterances of all names that might be needed in the current large geographic area. As previously stated, utterances may be recorded in any of a variety of digitally encoded audio formats. The recorded utterances may be stored in a compressed format, and uncompressed prior to output. A location determination module 110 determines the location of a driver. The location determination module 110 may comprise a GPS receiver, or a graphical user interface for the user to manually input the current location, as described in greater detail above. A storage manager 115 receives input from the location determination module 110. Based on this input, the storage manager 115 retrieves corresponding audio files from the large storage media 105. The storage manager 115 stores the audio files in the working storage 120 (i.e., run-time memory), possibly overwriting other data in working storage 120 that has now become obsolete due to a change of location. The storage manager 115 may decompress the recorded utterances, as previously described. A dialog manager 125 receives the location of the driver from the location determination module 110, and also receives the trip destination of the driver from a destination input module 130. The destination input module 130 may comprise a graphical user interface for the user to input the trip destination. With the addition of geographical information from the map database 135, the dialog manager 125 composes driving directions to be audibly output to the driver. Because the audio files for all needed names are already in working storage 120, the dialog manager 125 can instruct a speech playback module 140 to audibly output geographic names in natural speech, without resorting to speech synthesis.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A driving directions system capable of accessing a database comprising a storage memory storing a plurality of geographic names, wherein each of the plurality of geographic names is associated with at least one stored prerecorded spoken utterance of the associated geographic name, and wherein at least some of the plurality of geographic names are associated with a plurality of stored prerecorded spoken utterances of the associated geographic name, each pronounced according to a respective speech style of a particular region and/or pronounced in a particular language associated with the particular region, the driving directions system comprising:

a location determination module for determining the location of the driving directions system;

a run-time memory for temporarily storing at least some geographic names and the associated prerecorded spoken utterances associated with a route from a starting location to a destination location, the geographic names and associated prerecorded spoken utterances associated with the route forming a first set; and a storage manager to successively store subsets of the geographic names and the associated spoken utterances in the run-time memory by retrieving from the database only a subset of the geographic names and associated spoken utterances from the first set that are within a predetermined distance from a current location of the driving directions system, and storing the subset in the run-time memory, the storage manager further configured to periodically retrieve successive subsets from the remote database as the location of the driving directions system changes along the route, and to store the successive subsets in the run-time memory, wherein the geographic names and the associated spoken utterances that become out of range as the location changes are overwritten by portions of the next successive subset retrieved and stored in the run-time memory, the storage manager further configured to identify in each successive subset each of the geographic names in the subset having a plurality of stored prerecorded spoken utterances, and to select one of the plurality of stored prerecorded spoken utterances for retrieval and storing based, at least in part, on a similarity between the location determined by the location determination module and the particular region associated with the selected one of the plurality of stored prerecorded spoken utterances.

2. The driving directions system of claim 1, wherein the location determination module comprises a user-interface for manually inputting the location of the driving directions system.

3. The driving directions system of claim 2, wherein the user-interface comprises a graphical user-interface.

4. The driving directions system of claim 1, wherein the location determination module comprises a global positioning system (GPS) receiver.

5. The driving directions system of claim 1, further comprising a map storage means for storing at least one map.

6. The driving directions system of claim 5, further comprising a speech playback means for audibly outputting at least one of the prerecorded spoken utterances based on the location of the vehicle, the final destination, and the at least one map.

7. The driving directions system of claim 6, wherein the least one of the prerecorded spoken utterances is decompressed prior to the speech playback means audibly outputting the at least one of the subset of the utterances.

8. The driving directions system of claim 1, wherein the storage memory comprises at least one of a CD-ROM and a DVD-ROM.

9. The driving directions system of claim 1, wherein the storage memory is accessed via a network.

10. The driving directions system of claim 9, wherein the network is an Internet.

11. The driving directions system of claim 1, further comprising an index containing pointers to the prerecorded spoken utterances of geographic names.

12. The driving directions system of claim 11, wherein the index comprises a large geographic region portion.

13. The driving directions system of claim 12, wherein the large geographic region portion corresponds to one of a continent and a country.

14. The driving directions system of claim 12, wherein the large geographic region portion comprises a local geographic region portion.

15. The driving directions system of claim 14, wherein the local geographic region portion corresponds to a predetermined area in the large geographic region portion.

16. The driving directions system of claim 1, wherein the prerecorded spoken utterances of the geographic names are stored in a compressed format.

17. The driving directions system of claim 1, wherein the prerecorded spoken utterances of geographic names comprise digitally encoded audio files.

18. The driving directions system of claim 17, wherein the digitally encoded audio files comprise WAVE files.

19. A method for use in a driving directions system capable of accessing a database comprising a storage memory storing a plurality of geographic names, wherein each of the plurality of geographic names is associated with at least one stored prerecorded spoken utterance of the associated geographic name, and wherein at least some of the plurality of geographic names are associated with a plurality of stored prerecorded spoken utterances of the associated geographic name each pronounced according to a respective speech style of a particular region and/or pronounced in a particular language associated with the particular region, the method comprising acts of:

determining a location of the driving directions system;

identifying geographic names and the associated prerecorded spoken utterances associated with a route from a starting location to a destination location, the geographic names and associated prerecorded spoken utterances forming a first set;

successively storing subsets of the geographic names and the associated spoken utterances in a run-time memory by retrieving from the database only a subset of the geographic names and the associated spoken utterances from the first set that are within a predetermined distance from a current location of the driving directions system and storing the subset in the run-time memory;

periodically retrieving successive subsets from the remote database as the location of the driving directions system changes along the route and storing the successive subsets in the run-time memory;

overwriting the geographic names and the associated spoken utterances that become out of range as the location changes with portions of the next successive subset;

identifying in each successive subset each of the geographic names having a plurality of prerecorded utterances and selecting as the corresponding prerecorded utterance a single one of the plurality of stored prerecorded spoken utterances for each of the geographic names in the subset having a plurality of stored prerecorded spoken utterances for retrieval and storing based, at least in part, on a similarity between the location determined by the location determination module and the particular region associated with the selected one of the plurality of stored prerecorded spoken utterances; and storing the plurality of geographic names and the corresponding prerecorded utterances in a run-time memory.

20. At least one computer readable storage device storing instructions that, when executed on at least one processor, performs method for use in a driving directions system capable of accessing a database comprising a storage memory storing a plurality of geographic names, wherein each of the plurality of geographic names is associated with at least one stored prerecorded spoken utterance of the associated geographic name, and wherein at least some of the plurality of geographic names are associated with a plurality of stored prerecorded spoken utterances of the associated geographic name each pronounced according to a respective speech style of a particular region and/or pronounced in a particular language associated with the particular region, the method comprising acts of:

determining a location of the driving directions system;

identifying geographic names and the associated prerecorded spoken utterances associated with a route from a starting location to a destination location, the geographic names and associated prerecorded spoken utterances forming a first set;

successively storing subsets of the geographic names and the associated spoken utterances in a run-time memory by retrieving from the database only a subset of the geographic names and the associated spoken utterances from the first set that are within a predetermined distance from a current location of the driving directions system and storing the subset in the run-time memory;

periodically retrieving successive subsets from the remote database as the location of the driving directions system changes along the route and storing the successive subsets in the run-time memory;

overwriting the geographic names and the associated spoken utterances that become out of range as the location changes with portions of the next successive subset;

identifying in each successive subset each of the geographic names having a plurality of prerecorded utterances and selecting as the corresponding prerecorded utterance a single one of the plurality of stored prerecorded spoken utterances for each of the geographic names in the subset having a plurality of stored prerecorded spoken utterances for retrieval and storing based, at least in part, on a similarity between the location determined by the location determination module and the particular region associated with the selected one of the plurality of stored prerecorded spoken utterances; and storing the plurality of geographic names and the corresponding prerecorded utterances in a run-time memory.

\* \* \* \* \*